US009608890B1

(12) United States Patent
Wakeford et al.

(10) Patent No.: US 9,608,890 B1
(45) Date of Patent: Mar. 28, 2017

(54) SYSTEM AND METHOD FOR FORWARDING EXTERNAL NOTIFICATIONS OF EVENTS IN A VIRTUAL SPACE FROM A USER DEVICE TO A PRESENTATION CONTROL DEVICE

(71) Applicant: KABAM, INC., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 219 days.

(21) Appl. No.: 14/139,488

(22) Filed: Dec. 23, 2013

(51) Int. Cl.
G06F 13/40 (2006.01)
H04L 12/26 (2006.01)

(52) U.S. Cl.
CPC .............. H04L 43/0876 (2013.01)

(58) Field of Classification Search
None
See application file for complete search history.

(56) References Cited

U.S. PATENT DOCUMENTS

| 5,617,347 | A | * | 4/1997 | Lauritzen | G06F 12/0884 365/189.07 |
| 8,275,900 | B2 | | 9/2012 | Meenan et al. | 709/232 |
| 8,330,598 | B2 | | 12/2012 | Szucs | 340/540 |
| 8,335,833 | B1 | * | 12/2012 | Parkinson | H04N 21/4882 709/204 |
| 8,390,462 | B2 | | 3/2013 | Belz et al. | 340/573.1 |
| 8,671,434 | B2 | * | 3/2014 | Maddali | H04N 21/4126 725/106 |
| 2001/0056416 | A1 | * | 12/2001 | Garcia-Luna-Aceves | G06F 12/1483 |
| 2004/0162144 | A1 | * | 8/2004 | Loose | G07F 17/32 463/42 |
| 2006/0143668 | A1 | * | 6/2006 | Du Breuil | H04N 7/173 18 725/89 |
| 2007/0179854 | A1 | * | 8/2007 | Ziv | G06F 21/10 705/14.25 |

(Continued)

FOREIGN PATENT DOCUMENTS

WO 2014194184 12/2014

Primary Examiner — Philip Chea
Assistant Examiner — Wuji Chen
(74) Attorney, Agent, or Firm — Sheppard Mullin Richter & Hampton LLP

(57) ABSTRACT

Notifications of events that take place within a virtual space and/or information related the notifications may be transmitted from a server which hosts an instance of the virtual space to the user device via which users may interact with the virtual space. Based on the received notifications and/or the information related to those notifications, the user device may transmit external notifications to one or more presentation control devices that are within the vicinity of the user device. Determining a particular presentation control device to which the user device should transmit the event notification may depend on whether the presentation control device is located within the vicinity of the user device, a predefined association between a user and the presentation control device, and/or whether the user is present at the presentation control device. The presentation control device may concurrently display notifications that belong to different users.

5 Claims, 6 Drawing Sheets

(56) References Cited

U.S. PATENT DOCUMENTS

| | | | |
|---|---|---|---|
| 2007/0265091 A1* | 11/2007 | Aguilar, Jr. | G07F 17/32 463/42 |
| 2008/0134039 A1* | 6/2008 | Fischer | G06F 17/30053 715/733 |
| 2008/0320222 A1* | 12/2008 | Dhodapkar | G06F 12/121 711/118 |
| 2009/0063995 A1* | 3/2009 | Baron | G06Q 10/10 715/753 |
| 2009/0320099 A1* | 12/2009 | Rao | H04L 9/3236 726/3 |
| 2010/0071053 A1 | 3/2010 | Ansari et al. | 726/12 |
| 2011/0070879 A1* | 3/2011 | Walter | H04N 7/163 455/420 |
| 2011/0082729 A1 | 4/2011 | Carvallo | |
| 2011/0088058 A1 | 4/2011 | Velazquez et al. | 725/33 |
| 2012/0196682 A1 | 8/2012 | Xu et al. | 463/40 |
| 2012/0272267 A1 | 10/2012 | Klein et al. | 725/34 |
| 2012/0291070 A1 | 11/2012 | Feng et al. | 725/40 |
| 2012/0295704 A1 | 11/2012 | Reiche | |
| 2012/0307655 A1 | 12/2012 | Vyrros et al. | 370/252 |
| 2012/0309540 A1* | 12/2012 | Holme | H04L 67/26 463/42 |
| 2013/0084970 A1 | 4/2013 | Geisner et al. | 463/29 |
| 2013/0091582 A1* | 4/2013 | Chen | G06Q 10/10 726/26 |
| 2013/0103911 A1* | 4/2013 | Bulut | G06F 12/0866 711/144 |
| 2013/0143669 A1* | 6/2013 | Muller | A63F 13/12 463/42 |
| 2014/0066031 A1* | 3/2014 | Pfeffer | H04N 21/4788 455/414.1 |
| 2014/0207912 A1* | 7/2014 | Thibeault | H04L 67/2847 709/219 |
| 2014/0359476 A1 | 12/2014 | Wakeford et al. | 715/748 |

* cited by examiner

SYSTEM AND METHOD FOR FORWARDING EXTERNAL NOTIFICATIONS OF EVENTS IN A VIRTUAL SPACE FROM A USER DEVICE TO A PRESENTATION CONTROL DEVICE

FIELD OF THE DISCLOSURE

This disclosure relates to transmitting external notifications of events within a virtual space from a user device to one or more presentation control devices.

BACKGROUND

Typically, virtual spaces are configured such that when users are logged in to a virtual space, they may be notified of events that have occurred or are occurring (and in some cases that will occur) in the virtual space via a client device used by the corresponding user to log into the virtual space. If the user fails to act on an event occurring in the virtual space in a timely manner, the user may suffer negative consequences in the game as a result of the failure.

As such, what is needed is to be capable of effectively communicating event notifications to users when the users are away from the client device. These and other problems exist.

SUMMARY

One aspect of the disclosure relates to transmitting external notifications of events within a virtual space from a user device to one or more presentation control devices. Notifications may be transmitted to one or more presentation control devices within the vicinity of a user device. Determinations as to whether the notification should be transmitted to any presentation control device may be made based on whether the presentation control device is detected as being within the vicinity of the user device, a predefined association between a user and the presentation control device, and/or whether the user is present at the presentation control device. The presentation control device may concurrently display notifications that belong to different users. Determining a particular order of display in which the notifications should be arranged may be based on a timestamp associated with each of the notifications and/or one or more user parameters related to the users for whom the notifications were intended. Presentation control device may include, without limitation, a set-top box for controlling a television display, an Internet enabled (or "smart") television, a gaming console, and/or other devices.

The user device may be configured to provide access to the virtual space for one or more users. This may include presenting views of the virtual space, receiving control inputs or commands from a user with respect to one or more actions that should be executed in the virtual space, and/or other things. The user device may include, without limitation, a desktop computer, a laptop computer, a handheld computer, a tablet computing platform, a NetBook, a Smartphone, and/or other client computing platforms.

The user device may include one or more processors configured to execute computer program modules. The computer program modules may include one or more of a user interface module, a detection module, a notification forwarding module, a device registration module, a notification transmission module, and/or other modules.

The user interface module may be configured to facilitate presentation of views of the virtual space via a display of the user device, wherein one or more users interact with one or more entities within the virtual space through the views of the virtual space.

The detection module may be configured to detect presentation control devices within the vicinity of the user device. Presentation control devices that are located within a predefined range of the user device may be detected as being within the vicinity of the user device. The range may be defined by a type of wireless communication network (e.g., a NFC network, a Bluetooth network, and/or other communication network types) that is used for communication between the user device and the presentation control devices. Presentation control devices that are connected to a LAN and/or WLAN to which the user device is also connected may be detected as being within the vicinity of the user device.

The notification forwarding module may be configured to obtain a notification corresponding to a trigger event that takes place in the virtual space. The notification may be intended for a user of the user device. The notification may have been transmitted from a server and/or received at the user device.

The notification forwarding module may determine whether the notification should be transmitted to any presentation control device detected by the detection module as being within the vicinity of the user device. This determination may be made based on one or more parameters. The one or more parameters may include a parameter determined based on whether a particular presentation control device (detected by the detection module) has a predefined association with the user for whom the notification is intended. A first database may store predefined associations between presentation control devices and users. The first database may be accessed to determine whether the particular presentation control device has a predefined association with the particular user.

The one or more parameters may include a presence parameter related to a presence of the user at the presentation control devices (detected by the detection module). The presentation control devices may include a first presentation control device. The presence may be determined based on whether the first presentation control device is powered on, whether the first presentation control device is in an active mode, whether the user is logged in at the first presentation control device, whether the user is logged in to an instant messaging service via the first presentation control device, whether the user is logged into an email account via the first presentation control device, and/or other presence parameters.

The device registration module may be configured to receive a request to register a presentation control device with the user device, wherein the request comprising an identification of the presentation control device. The device registration module may obtain an identification of a user to be associated with the presentation control device, establish an association between the presentation control device and the user, and/or store the association between the presentation control device and the user in the first database. To verify the identification of the user to be associated with the presentation control device, the device registration module may identify user information that is associated with users having access to the virtual space (e.g., user accounts). The device registration module may then verify that the user information comprises the identification of the user. Once verified, the device registration module may establish an association between the presentation control device and the user. In some embodiments, the presentation control device may be associated with a single user or multiple users.

The notification transmission module may be configured to transmit, via a communication medium that is external to the virtual space, the notification to a first presentation control device based on a detection of the first presentation control device as being within the vicinity of the user device, and further based on a determination that the notification should be transmitted to the first presentation control device. The communication medium that is external to the virtual space may be a push notification, a text message, an instant message, and/or other communication medium.

The presentation control device may concurrently display notifications that belong to different users. Determining a particular order of display in which the notifications should be arranged may be based on a timestamp associated with each of the notifications and/or one or more user parameters related to the users for whom the notifications were intended.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
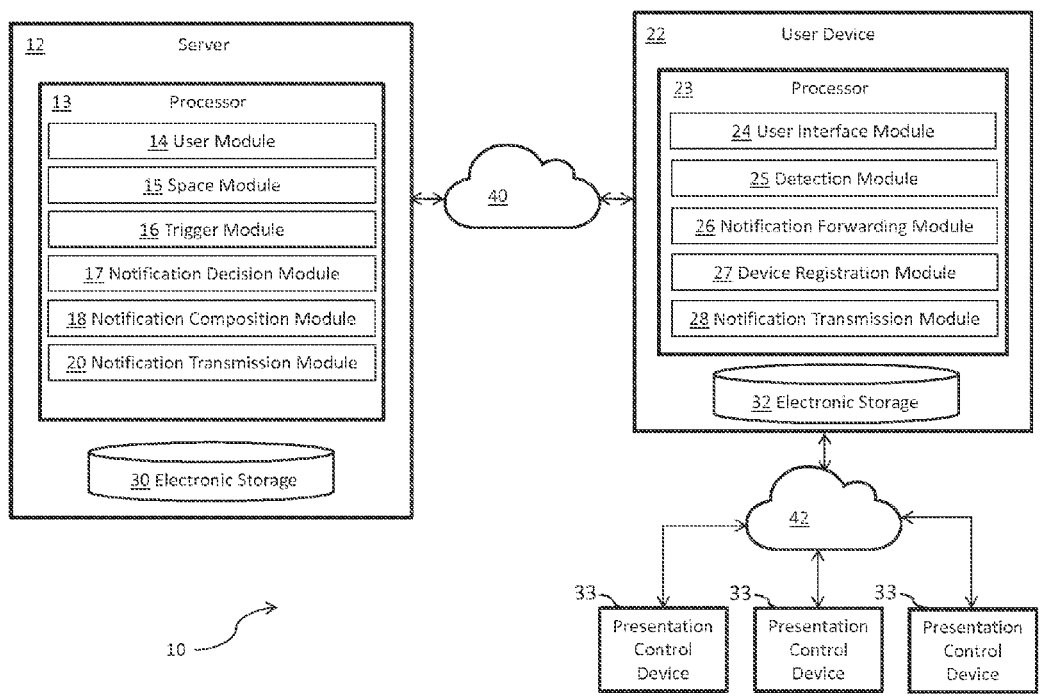
FIG. 1 illustrates a system configured to transmit external notifications of events that take place in a virtual space from a user device to a presentation control device.

FIG. 1 illustrates a system 10 configured to transmit external notifications of events that take place in a virtual space from a user device to a presentation control device. As used herein, the presentation control device may comprise a set-top box ("STB"), a smart television ("smart TV"), a gaming console, and/or other client computing platforms.

Notifications of events that take place within a virtual space and/or information related the notifications may be transmitted from a server which hosts an instance of the virtual space to the user device via which users may interact with the virtual space. Based on the received notifications and/or the information related to those notifications, the user device may transmit external notifications to one or more presentation control devices that are within the vicinity of the user device. The external notifications may be sent, for example, via email, text message, instant message (external from the virtual space), push notification and/or through other external communication media.

Determining a particular presentation control device to which the user device should transmit the event notification may depend on whether the presentation control device is located within the vicinity of the user device, a predefined association between a user and the presentation control device, and/or whether the user is present at the presentation control device. The presentation control device may concurrently display notifications that belong to different users. Determining a particular order of display in which the notifications should be arranged may be based on a timestamp associated with each of the notifications and/or one or more user parameters related to the users for whom the notifications were intended.

In some implementations, system 10 may include a server 12 and a user device 22. Server 12 may be configured to communicate with user device 22 according to a client/server architecture. The users may access system 10 and/or the virtual space via user device 22.

Server 12 may be configured to execute one or more computer program modules. The computer program modules may include one or more of a user module 14, a space module 15, a trigger module 16, a notification decision module 17, a notification composition module 18, a notification transmission module 20, and/or other modules.

User module 14 may be configured to access and/or manage one or more user accounts associated with users of system 10. The one or more user accounts may include user information. The one or more user accounts and/or user information may include information stored by server 12, user device 22, one or more of presentation control devices 33, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a user device identification associated with a user, a phone number associated with a user, user settings, and/or other information related to users. The user information may include and/or indicate an activity level of the user. The activity level may include previous login time(s), previous logout time(s), login frequency, time spent logged in, and/or other activity information. The user information may include information related to purchases in or for the virtual space. Such information may include, for example, purchase information for individual transactions, a spend rate, a total spend amount, and/or other information related to user purchases.

As will be discussed further below, users may participate in the virtual space by controlling and/or interacting with entities within the virtual space. The user information may include information related to the entities controlled and/or interacted with by the users in the virtual space. Such information may include, for example, an entity type, an entity class, an entity identification, a level, inventory information, status information, and/or other information related to entities controlled and/or interacted with by users in the virtual space.

Space module 15 may be configured to implement the instance of the virtual space executed by the computer modules to determine view information defining view of the virtual space. The view information may then be communicated (e.g., via streaming, via object/position data, and/or other information) from server 12 to user device 22 for presentation to users. The view information determined and transmitted to user device 22 may correspond to an entity being controlled by a user via user device 22. The view information determined and transmitted to user device 22 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via user device 22 which may present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 15 is not intended to be limiting. Space module 15 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 15, users may control entities to interact with the virtual space and/or each other. The entities may include one or more of characters, objects, simulated physical phenomena (e.g., wind, rain, earthquakes, and/or other phenomena), and/or other elements within the virtual space. The user characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through user device 22. The users may interact with each other through communications exchanged within the virtual space. Such communications may include one or more of textual chat, instant messages, private messages, voice communications, and/or other communications. Communications may be received and entered by the users via user device 22. Communications may be routed to and from the appropriate users through server 12 (e.g., through space module 15).

Within the virtual space, users may participate in a game. The game may include various tasks, levels, quests, and/or other challenges or activities for users to participate in. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. Space module 15 may be configured to perform the functions associated with the game in executing the instance of the virtual space.

Trigger module 16 may be configured to identify trigger events within the virtual space. The trigger events may correspond to external notifications provided to the users. Trigger module 16 may identify trigger events by monitoring the instance of the virtual space, and identifying events occurring in the instance that correspond to events in a specific set of events. Trigger events may include or be associated with, for example, upgrades, contests (e.g., attacks, challenges, or other contest or invitations to contests), travel in the virtual space (e.g., as an entity or a portion of an entity travels from one location in the virtual space to another locations), special occasions in the virtual space, entity creation (e.g., spawning or generation of new units of equipment and/or troops), and/or other events.

The events in the set of events may include various types of events. For example, the events in the set of events may include conclusory events, initiatory events, first party events, third party events, warning events, and/or other types of events. A conclusory event may occur at the end of some process. By way of example, a conclusory event may occur at the end of an upgrade period, at the end of a travel period, at the end of a contest (e.g., between entities controlled by users), at the end of a cool down period, and/or at the end of other processes. An initiatory event may occur at the beginning of a process. An event may be a first party event to a user that initiates the event (or the corresponding process), or the event may be a first party event to a user directly involved in the event (or the corresponding process). An event may be a third party event to a user that did not initiate the event (or corresponding process), or the event may be a third party event to a user that is not directly involved in the event (or corresponding process).

In identifying the trigger events, trigger module 16 may identify the users associated with the trigger events. The users associated with a trigger event may include a user (or the user controlling the entity) that initiates the trigger event, a user (or the user controlling the entity) that is the target or object of the trigger event, and/or other users.

Notification decision module 17 may be configured to determine whether notifications of the identified trigger events should be transmitted to the users associated with the trigger events. Such determinations may be made based on one or more of an event parameter, a user parameter, a user setting, an entity parameter, and/or other parameters or information. Event parameters may include one or more event type, event outcome, event timing, and/or other parameters.

User parameters may be stored in the user accounts managed by user module 14. User parameters may include one or more of an activity level parameter, a previous notification parameter, a notification response parameter, a user spending parameter, and/or other parameters. An activity level parameter may indicate an activity level of the user in the virtual space. A previous notification parameter may reflect previous notifications generated to a user. For example, a previous notification parameter may reflect a time of a previous notification, a number of notifications within some window of time (e.g., a current day, a current hour, a current week, a rolling window of time, and/or other windows of time), a notification frequency, and/or other parameters related to one or more previous notifications. A notification response parameter may reflect a responsiveness of the user to previous notifications. A user spending parameter may reflect spending of the user in the virtual space.

User settings may include settings under the direct control of the user. For example, a user setting may specify certain types of events for which notifications should or should not be received, a maximum number of notifications within some period of time, and/or other user configurable settings. In some implementations, user configured user settings may be adjusted automatically based on user behavior (e.g., responsiveness, activity, spending, and/or other behavior). However, user settings may differ from user parameters in that user parameters may be derived from user behavior in the virtual space while user settings may be controlled directly (e.g., through a control interface).

Entity parameters may reflect information about a user controlled entity within the virtual space. Such information may include, for example, a status, an inventory, a level, a score, a virtual currency account, a relationship (e.g., an alliance, a friendship, and/or other relationships), and/or other information. Entity parameters may be stored in the user accounts managed by user module 14.

Notification decision module 17 may be configured such that responsive to an event being triggered, a set of one or more rules may be accessed. The set of one or more rules may specify, based on one or more of an activity level parameter, a previous notification parameter, a notification response parameter, a user spending parameter, and/or other parameters, whether a notification should be sent to one or more of the users associated with the event. By way of non-limiting example, an attack by a first entity controlled by a first user on a second entity controlled by a second user may be identified as a trigger event by trigger module 16. Responsive to such identification, notification decision module 17 may determine whether a notification of the attack should be sent to the second user. The determination may be based on an activity parameter of the second user (e.g., no notification may be generated if the second user is no longer active in the virtual space), a responsiveness of the second user to notifications (e.g., no notification may be generated if the second user has traditionally not responded to notifications), a previous notification parameter (e.g., no notification may be generated if the second user has already received a threshold number of notifications in the past day), and/or other parameters.

Notification composition module 18 may be configured to compose notifications for transmission to the users. This may include determining one or more of notification content, notification format, communication media, and/or other aspects of the notifications. Notification content may include text, images, and/or other content included in a notification. Determining the communication media may include selecting one or more communication media (e.g., email, text, instant message, and/or other media) for a notification. A notification may be composed by notification composition module 18 based on one or more of event parameters, user parameters, user settings, a selected communication media for the notification, and/or other parameters or information.

In some embodiments, notifications may include incentive offers for virtual items. A virtual item may include one or more of an item of clothing, a tool, a weapon, a pet, a vehicle, currency, a potion or elixir, ingredients, and/or other virtual items that exist in the virtual space. A virtual item may provide a functional advantage in the virtual space to its owner (e.g., an advantage in the game).

Notification transmission module 20 may be configured to transmit notifications and/or information related to the notifications from server 12 to user device 22. In some implementations, the notifications may be transferred within the virtual space such that users can be notified while the users are logged into the virtual space. In other implementations, such transmission may be made through communication media external to the virtual space. For example, notification transmission module 28 may transmit notifications to users via email, text message, instant message, and/or other communication media external to the virtual space. Communication media external to the virtual space may include communication media not relayed to the users by server 12. Instead, such communication may be relayed to the users through an external service provider. As notifications are transmitted to users, records of such transmissions may be made (e.g., in the user accounts). The records may include information about one or more of a format of the notifications, the trigger events that triggered the notifications, the content in the notifications, the communication media used to transmit the notifications, and/or other information about the notifications. These records may be used by notification decision module 17, notification composition module 18, and/or other modules.

User device 22 may be configured to communicate with server 12 according to a client/server architecture. User device 22 may provide users access to system 10 and/or a virtual space created by space module 15. User device 22 may be configured to communicate with presentation control devices 33 via one or more communication networks 42. Communication networks 42 may comprise a near-field communication (NFC) network, a wireless fidelity (WiFi) network, a Bluetooth network, an Ethernet network, and/or other communication network types. By way of non-limiting example, user device 22 may include a desktop computer, a laptop computer, a handheld computer, a tablet computing platform, a NetBook, a Smartphone, and/or other computing platforms.

User device 22 may be configured to execute one or more computer program modules. The one or more computer program modules may include one or more of a user interface module 24, a detection module 25, a notification forwarding module 26, a device registration module 27, a notification transmission module 28, and/or other modules.

User interface module 24 may be configured to receive the view information defining views of the virtual space from server 12 and/or facilitate presentation of the views of the virtual space via a display of user device 22 based on the view information. A user may interact with the virtual space by interacting with and/or controlling one or more entities within the virtual space through the views of the virtual space.

Detection module 25 may be configured to detect presentation control devices 33 within the vicinity of user device 22 by detecting presentation control devices 33 that are located within a predefined range of user device 22. The range may be defined by a type of wireless communication network (e.g., a NFC network, a Bluetooth network, and/or other communication network types) that is used for communication between user device 22 and presentation control devices 33. For example, user device 22 and/or a presentation control device may be an NFC-enabled device. User device 22 may operate in a "Reader" mode in which user device 22 may detect the presentation control device with a NFC tag. User device 22 may detect the presentation control device while operating in a "Peer-to-peer" mode which enables a bi-directional exchange of data between two NFC-enabled devices. Communication based on NFC standards typically requires the devices to be placed within close proximity to each other, thereby providing a shorter distance range than Bluetooth. As such, depending on which type of wireless communication network is used for establishing communication links between user device 22 and presentation control devices 33, the range within which detection module 25 can detect the presentation control devices may vary. Thus, detection module 25 may detect one or more presentation control devices that are located within the range defined by the particular type of wireless communication network used for establishing communication links between user device 22 and presentation control devices 33.

Detection module 25 may be configured to detect presentation control devices 33 within the vicinity of user device 22 by detecting presentation control devices 33 that are connected to a local area network (LAN) to which user device 22 is also connected. As used herein, the LAN comprises a wired LAN and/or a wireless LAN (WLAN). Detection module 25 may identify a LAN to which user device 22 is connected. Detection module 25 may identify and/or determine one or more presentation control devices that are connected to the identified LAN to which user device 22 is connected.

Notification forwarding module 26 may be configured to obtain the notification (and/or information related to the notification) by identifying the notification (and/or information related to the notification) received from server 12. The notification may be a notification intended for a user of the user device. This notification transmitted from server 12 and/or received at user device 22 may be an internal notification (internal to the virtual space) or an external notification (external to the virtual space). The notification may be transmitted to (and/or forwarded to) one or more presentation control devices 33 detected by detection module 25 as being within the vicinity of user device 22.

Notification forwarding module 26 may be configured to determine whether the notification should be transmitted to (and/or forwarded to) any presentation control device detected by detection module 25 as being within the vicinity of user device 22. In some implementations, notification forwarding module 26 may be configured to make the determination based on one or more parameters. The one or more parameters may include a parameter determined based on whether a particular presentation control device (detected by detection module 25) has a predefined association with the user for whom the notification is intended for. Notification forwarding module 26 may determine whether there is a predefined association between the particular presentation control device and the user by accessing a database storing predefined associations between presentation control devices and users of system 10 and/or user device 22. This database may be referred to as a registration database. The registration database may be maintained and/or stored in an electronic storage 32. For example, the registration database may store a presentation control device identification ("ID") (and/or other identifying information) and its associated user ID(s) (and/or other identifying information).

The presentation control device ID may be associated with a single user ID or a plurality of user IDs. For example, a first presentation control device located in the living room of a house may be shared among the members of the household (e.g., User A and User B). In this example, the first presentation control device may be associated with multiple users and/or their corresponding user devices. As such, when a user device that belongs to User A detects the first presentation control device within the vicinity of the user device and obtains a notification intended for User A, the notification may be transmitted to the first presentation control device. Similarly, when a user device that belongs to User B detects the first presentation control device within the vicinity of the user device and obtains a notification intended for User B, the notification may be transmitted to the first presentation control device. In another example, a second presentation control device may be located in the User A's bedroom. The second presentation control device may be associated with User A and/or User A's user device. Similarly, a third presentation control device may be located in the User B's bedroom, which may be associated with User B and/or User B's user device.

The information stored in the registration database may be generated based on a user input. For example, a user may specify presentation control device IDs and their associated user IDs. The information stored in the registration database may be automatically generated by device registration module 27 as discussed herein with respect to device registration module 27.

The one or more parameters upon which notification forwarding module 26 make the determination of whether the notification should be transmitted to a particular presentation control device detected by detection module 25 may include a presence parameter related to a presence of the user (for whom the notification is intended for) at the particular presentation control device. Sending the notification to the presentation control device when the user is present at the presentation control device can increase the chances that the user will actually receive and/or view the notification. Notification forwarding module 26 may determine the presence based on whether the presentation control device is powered on, whether the presentation control device is in an active mode, whether the user is logged in at the presentation control device, whether the user is logged in to an instant messaging service via the presentation control device, whether the user is logged into an email account via the presentation control device, and/or other presence parameters. The presentation control device may be in an active mode, for example, when it is not in a sleep mode and/or hibernation mode. In some instances, based on which service the user is logged into, the notification may be transmitted via different communication medium types. For example, if the user is logged into a particular instant messaging service, the notification may be delivered in the form of an instant message via that instant messaging service.

Device registration module 27 may be configured to register a presentation control device with user device 22. Once successfully registered, device registration module 27 may establish an association between the presentation control device, its corresponding user, and/or user device 22. Device registration module 27 may store the association in the registration database.

Device registration module 27 may receive a request to register the presentation control device with user device 22. The request to register the presentation control device may comprise information identifying the presentation control device (e.g., presentation control device ID). The request may be initiated at the presentation control device and/or transmitted to user device 22. The request may be system-generated and/or generated based on a user input. For example, a user may create the request via the presentation control device and/or send the request from the presentation control device, an initiating device, to user device 22, a target device. In another example, user device 22 may request the presentation control device to send a system-generated request from the presentation control device to user device 22.

Device registration module 27 may, upon receiving the request, determine one or more users that should be associated with the presentation control device indicated in the request. Device registration module 27 may, via user device 22 and/or the presentation control device, invoke a user authentication service which may be used to authenticate a user to be associated with the presentation control device. For example, device registration module 27 may prompt the user to provide information identifying the user such as security login information used in the virtual space and/or other identifying information. Device registration module 27 may access user accounts managed by user module 14 and/or verify that the user accounts include the user identification information provided by the user. In doing so, information in the user accounts may be compared to the user identification information provided by the user to determine whether any of the user accounts contains information that match with the user identification information provided by the user. When there is a match between the user identification information provided by the user and a particular user account, device registration module 27 may establish an association between the presentation control device and that particular user account (e.g., user ID). The established association may be stored in the registration database.

Notification transmission module 28 may be configured to transmit a notification from user device 22 to a presentation control device based on a detection of the presentation control device as being within the vicinity of user device 22, and further based on a determination that the notification should be transmitted to the presentation control device. Such transmission may be made through communication media external to the virtual space. For example, notification transmission module 28 may transmit notifications to users via email, text message, instant message, and/or other communication media external to the virtual space.

Presentation control device 33 may comprise a set-top box ("STB"), a smart television ("smart TV"), a gaming console, and/or other client computing platforms. In some embodiments, presentation control device 33 may be associated with a single user. The notifications intended for that user may be arranged, for example, in a chronological order (e.g., from newest notifications to oldest notifications) based on the timestamp associated with each of the notifications. The timestamp may comprise date and time that the each of the notifications was generated (e.g., by server 12 or by user device 22), transmitted from user device 22, and/or received by presentation control device 33. The notifications may then be displayed via a display unit coupled to presentation control device 33 in the chronological order. The order of display in which the notifications may be arranged may be determined based on one or more of an event parameter, a user parameter, a user setting, an entity parameter, and/or other parameters or information.

In some embodiments, presentation control device 33 may concurrently display notifications that belong to different users. For example, a first presentation control device located in the living room of a house may be shared among the members of the household (e.g., User A and User B). In this example, the first presentation control device may be associated with multiple users and/or their corresponding user devices. As such, when a user device that belongs to User A detects the first presentation control device within the vicinity of the user device and obtains a notification intended for User A, the notification may be transmitted to the first presentation control device. Similarly, when a user device that belongs to User B detects the first presentation control device within the vicinity of the user device and obtains a notification intended for User B, the notification may be transmitted to the first presentation control device.

Determining a particular order of display in which the notifications that belong to different users should be arranged may be based on a timestamp associated with each of the notifications and/or one or more user parameters related to the users for whom the notifications were intended. For example, presentation control device 33 may receive a first notification intended for a first user from a first user device. The first user may interact with one or more entities within the virtual space that is accessible via the first user device. Presentation control device 33 may receive a second notification intended for a second user from a second user device. The second user may interact with one or more entities within the virtual space that is accessible via the second user device.

Presentation control device 33 may determine an order of display in which the first and second notifications should be arranged based on a timestamp associated with each of the first notification and the second notification. The timestamp associated with each of the first and second notifications may comprise date and time that the each of the first and second notifications was generated (e.g., by server 12 or by user device 22), transmitted from the corresponding user device, and/or received by presentation control device 33. As such, the notifications may be displayed in a chronological order (e.g., from oldest notifications to newest notifications or from newest notifications to oldest notifications). For example, the newest notifications may be displayed in a section of the display screen that is more visible and noticeable (e.g., at the top of the display screen). In this example, the oldest notifications may appear at the bottom of the display screen. In some embodiments, a notification may expire after a predetermined time period has elapsed from the date and time of the timestamp associated with the notification. In these embodiments, the notification may automatically disappear from the display screen of presentation control device 33 once the notification expires.

Presentation control device 33 may determine the order of display based on user parameters related to the first user and the second user. For example, the user parameters may comprise an activity metric that indicates an activity of the first user or the second user in the virtual space. In this manner, notifications related to users with a higher activity level (e.g., spending more time in the virtual space, purchasing more items through the virtual space, etc.) may be displayed in a section of the display screen that is more visible and noticeable (e.g., the top of the display screen). Any other user parameters as discussed herein with respect to user module 14 may be used to influence the order of display. Further, the order of display may be determined based on one or more of an event parameter, a user setting, an entity parameter, and/or other parameters or information.

In some embodiments, the order of display may be updated every time a new notification arrives at presentation control device 33 and/or at a predetermined time interval. Presentation control device 33 may re-arrange the notifications based on the updated order of display. In some embodiments, presentation control device 33 may determine the top N notifications based on the determined order of display. In some embodiments, only the top N notifications may be displayed via a display unit coupled to presentation control device 33.

Server 12 and/or user device 22 may be operatively linked via one or more electronic communication links. For example, such electronic communication links may be established, at least in part, via a network 40 such as the Internet and/or other networks. It will be appreciated that this is not intended to be limiting, and that the scope of this disclosure includes implementations in which server 12 and/or user device 22 may be operatively linked via some other communication media.

Server 12 may include electronic storage 30, one or more processors 13, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

User device 22 may include electronic storage 32, one or more processors 23, and/or other components. User device 22 may include communication lines, or ports to enable the exchange of information with a network and/or other computing platforms. Illustration of user device 22 in FIG. 1 is not intended to be limiting. One or more processors 23 may be configured to execute the computer program modules as discussed herein. The computer program modules may be configured to enable an expert or user associated with user device 22 to interface with server 12 and/or presentation control devices 33, and/or provide other functionality attributed herein to user device 22.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 32 may comprise electronic storage media that electronically stores information. The electronic storage media of electronic storage 32 may include one or both of system storage that is provided integrally (i.e., substantially non-removable) with user device 22 and/or removable storage that is removably connectable to user device 22 via, for example, a port (e.g., a USB port, a firewire port, etc.) or a drive (e.g., a disk drive, etc.). Electronic storages 30 and 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storages 30 and 32 may include one or more virtual storage resources (e.g., cloud storage, a virtual private network, and/or other virtual storage resources). Electronic storages 30 and 32 may store software algorithms, information determined by processor 13, information determined by processor 23, information received from server 12, information received from user device 22, information received from presentation control devices 33 and/or other client computing platforms, and/or other information that enables server 12 and/or user device 22 to function as described herein.

Processor(s) 13 is configured to provide information processing capabilities in server 12. As such, processor 13 may include one or more of a digital processor, an analog processor, a digital circuit designed to process information, an analog circuit designed to process information, a state machine, and/or other mechanisms for electronically processing information. Although processor 13 is shown in FIG. 1 as a single entity, this is for illustrative purposes only. In some implementations, processor 13 may include a plurality of processing units. These processing units may be physically located within the same device, or processor 13 may represent processing functionality of a plurality of devices operating in coordination. Processor 13 may be configured to execute modules 14, 15, 16, 17, 18, and/or 20. Processor 13 may be configured to execute modules 14, 15, 16, 17, 18, and/or 20 by software; hardware; firmware; some combination of software, hardware, and/or firmware; and/or other mechanisms for configuring processing capabilities on processor 13.

It should be appreciated that although modules 14, 15, 16, 17, 18, and/or 20 are illustrated in FIG. 1 as being co-located within a single processing unit, in implementations in which processor 13 includes multiple processing units, one or more of modules 14, 15, 16, 17, 18, and/or 20 may be located remotely from the other modules. The description of the functionality provided by the different modules 14, 15, 16, 17, 18, and/or 20 described below is for illustrative purposes, and is not intended to be limiting, as any of modules 14, 15, 16, 17, 18, and/or 20 may provide more or less functionality than is described. For example, one or more of modules 14, 15, 16, 17, 18, and/or 20 may be eliminated, and some or all of its functionality may be provided by other ones of modules 14, 15, 16, 17, 18, and/or 20. As another example, processor 13 may be configured to execute one or more additional modules that may perform some or all of the functionality attributed below to one of modules 14, 15, 16, 17, 18, and/or 20.

Processor(s) 23 is configured to provide information processing capabilities in user device 22. As such, processor 23 may include one or more of a digital processor, an analog processor, a digital circuit designed to process information, an analog circuit designed to process information, a state machine, and/or other mechanisms for electronically processing information. Although processor 23 is shown in FIG. 1 as a single entity, this is for illustrative purposes only. In some implementations, processor 23 may include a plurality of processing units. These processing units may be physically located within the same device, or processor 23 may represent processing functionality of a plurality of devices operating in coordination. Processor 23 may be configured to execute modules 24, 25, 26, 27, and/or 28. Processor 23 may be configured to execute modules 24, 25, 26, 27, and/or 28 by software; hardware; firmware; some combination of software, hardware, and/or firmware; and/or other mechanisms for configuring processing capabilities on processor 23.

It should be appreciated that although modules 24, 25, 26, 27, and/or 28 are illustrated in FIG. 1 as being co-located within a single processing unit, in implementations in which processor 23 includes multiple processing units, one or more of modules 24, 25, 26, 27, and/or 28 may be located remotely from the other modules. The description of the functionality provided by the different modules 24, 25, 26, 27, and/or 28 described below is for illustrative purposes, and is not intended to be limiting, as any of modules 24, 25, 26, 27, and/or 28 may provide more or less functionality than is described. For example, one or more of modules 24, 25, 26, 27, and/or 28 may be eliminated, and some or all of its functionality may be provided by other ones of modules 24, 25, 26, 27, and/or 28. As another example, processor 23 may be configured to execute one or more additional modules that may perform some or all of the functionality attributed below to one of modules 24, 25, 26, 27, and/or 28.

Figure 2:
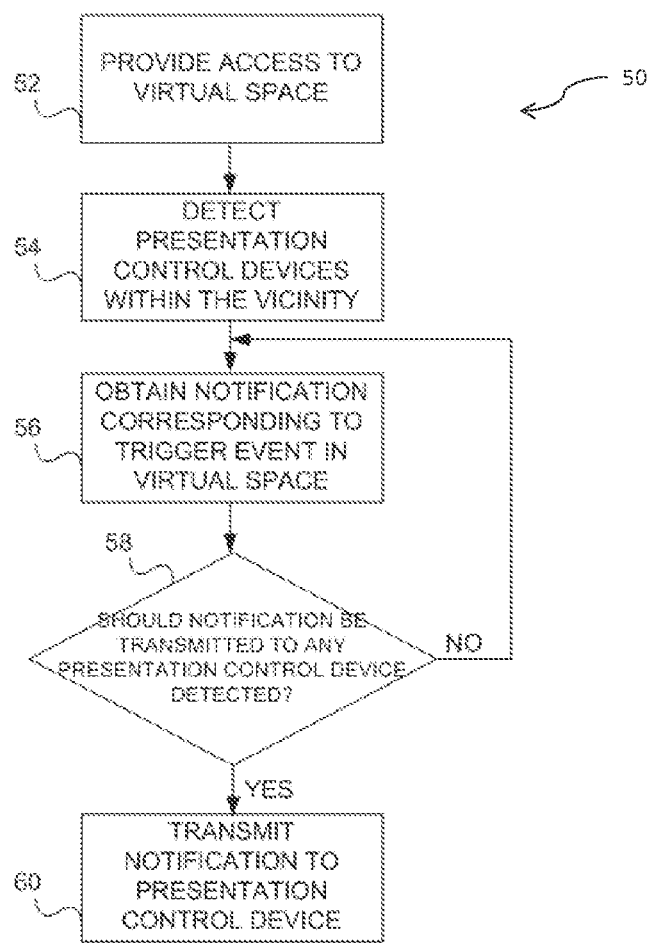
FIG. 2 illustrates a method of transmitting external notifications of events that take place in a virtual space from a user device to a presentation control device.

FIG. 2 illustrates a method 50 of transmitting external notifications of events that take place in a virtual space from a user device to a presentation control device. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, user device 22 may provide access to the virtual space where the user of user device 22 may interact with one or more entities within the virtual space using the user device 22. For example, through the views of the virtual space presented to a user via a display of user device 22, the user may interact with and/or control one or more entities within the virtual space. In some embodiments, operation 52 may be performed by a user interface module the same as or similar to user interface module 24 (shown in FIG. 1 and described herein).

At an operation 54, presentation control devices within the vicinity of the user device may be detected. Presentation control devices that are located within a predefined range of the user device may be detected as being within the vicinity of the user device. The range may be defined by a type of wireless communication network (e.g., a NFC network, a Bluetooth network, and/or other communication network types) that is used for communication between the user device and the presentation control devices. Presentation control devices that are connected to a LAN and/or WLAN to which the user device is also connected may be detected as being within the vicinity of the user device. In some implementations, operation 54 may be performed by a detection module the same as or similar to detection module 25 (shown in FIG. 1 and described herein).

At an operation 56, a notification corresponding to a trigger event that takes place in the virtual space may be obtained by identifying the notification received from a server. This notification may be a notification intended for a user of the user device. In some implementations, operation 56 may be performed by a notification forwarding module the same as or similar to notification forwarding module 26 (shown in FIG. 1 and described herein).

At an operation 58, it may be determined whether the obtained notification should be transmitted to any presentation control device detected at operation 54 as being within the vicinity of the user device. This determination may be made based on one or more parameters. The one or more parameters may include a parameter determined based on whether a particular presentation control device (detected at operation 54) has a predefined association with the user for whom the notification is intended. A first database may store predefined associations between presentation control devices and users. The first database may be accessed to determine whether the particular presentation control device has a predefined association with the particular user. The one or more parameters may include a presence parameter related to a presence of the user (associated with the notification) at the presentation control devices detected at operation 54. The presentation control devices may include a first presentation control device. The presence may be determined based on whether the first presentation control device is powered on, whether the first presentation control device is in an active mode, whether the user is logged in at the first presentation control device, whether the user is logged in to an instant messaging service via the first presentation control device, whether the user is logged into an email account via the first presentation control device, and/or other presence parameters. In some implementations, operation 58 may be performed by a notification forwarding module the same as or similar to notification forwarding module 26 (shown in FIG. 1 and described herein).

At an operation 60, the notification may be transmitted, via a communication medium that is external to the virtual space, to a first presentation control device based on a detection of the first presentation control device as being within the vicinity of the user device (at operation 54), and further based on a determination that the notification should be transmitted to the first presentation control device (at operation 58). In some implementations, operation 60 may be performed by a notification transmission module the same as or similar to notification transmission module 28 (shown in FIG. 1 and described herein).

Figure 3:
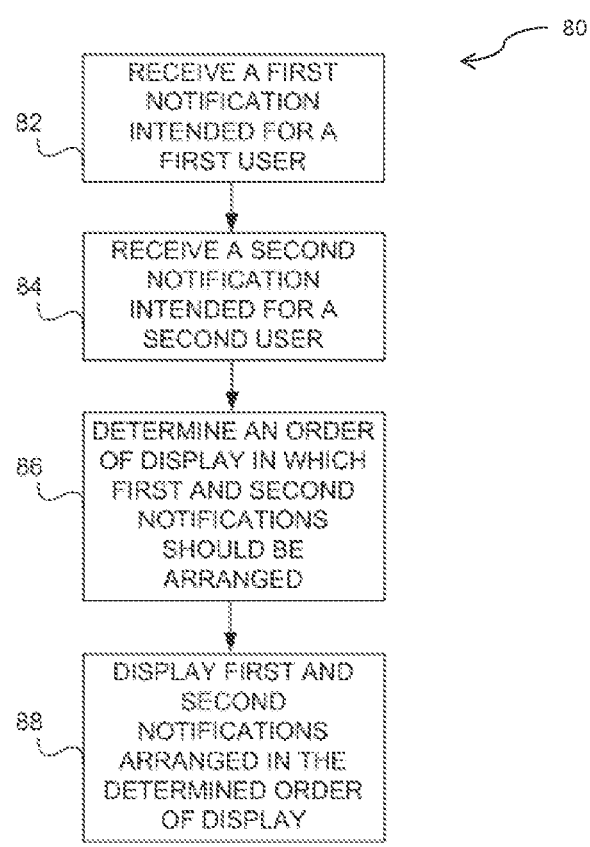
FIG. 3 illustrates a method of receiving, at a presentation control device, external notifications of events that take place in a virtual space from user devices where the presentation control device is within the vicinity of the user devices.

FIG. 3 illustrates a method 80 of receiving, at a presentation control device, external notifications of events that take place in a virtual space from user devices where the presentation control device is within the vicinity of the user devices. The operations of method 80 presented below are intended to be illustrative. In some embodiments, method 80 may be accomplished with one or more additional operations not described, and/or without one or more of the operations discussed. Additionally, the order in which the operations of method 80 are illustrated in FIG. 3 and described below is not intended to be limiting.

In some embodiments, method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80.

Presentation control device 33 may concurrently display notifications that belong to different users. In an operation 82, presentation control device 33 may receive a first notification intended for a first user from a first user device. The first user may interact with one or more entities within the virtual space that is accessible via the first user device.

In an operation 84, presentation control device 33 may receive a second notification intended for a second user from a second user device. The second user may interact with one or more entities within the virtual space that is accessible via the second user device.

In an operation 86, presentation control device 33 may determine an order of display in which the first and second notifications should be arranged based on a timestamp associated with each of the first notification and the second notification. The timestamp associated with each of the first and second notifications may comprise date and time that the each of the first and second notifications was generated (e.g., by server 12 or by user device 22), transmitted from the corresponding user device, and/or received by presentation control device 33. As such, the notifications may be displayed in a chronological order (e.g., from oldest notifications to newest notifications or from newest notifications to oldest notifications). For example, the newest notifications may be displayed in a section of the display screen that is more visible and noticeable (e.g., at the top of the display screen). In this example, the oldest notifications may appear at the bottom of the display screen.

Presentation control device 33 may determine the order of display based on user parameters related to the first user and the second user. For example, the user parameters may comprise an activity metric that indicates an activity of the first user or the second user in the virtual space. In this manner, notifications related to users with a higher activity level (e.g., spending more time in the virtual space, purchasing more items through the virtual space, etc.) may be displayed in a section of the display screen that is more visible and noticeable (e.g., the top of the display screen). Any other user parameters and/or other parameters as discussed herein may be used to influence the order of display.

In an operation 88, presentation control device 33 may display the first and second notifications arranged in the determined order of display. In some embodiments, the order of display may be updated every time a new notification arrives at presentation control device 33 and/or at a predetermined time interval. Presentation control device 33 may display the notifications based on the updated order of display. In some embodiments, presentation control device 33 may determine the top N notifications based on the determined order of display. In some embodiments, only the top N notifications may be displayed via a display unit coupled to presentation control device 33.

Figure 4:
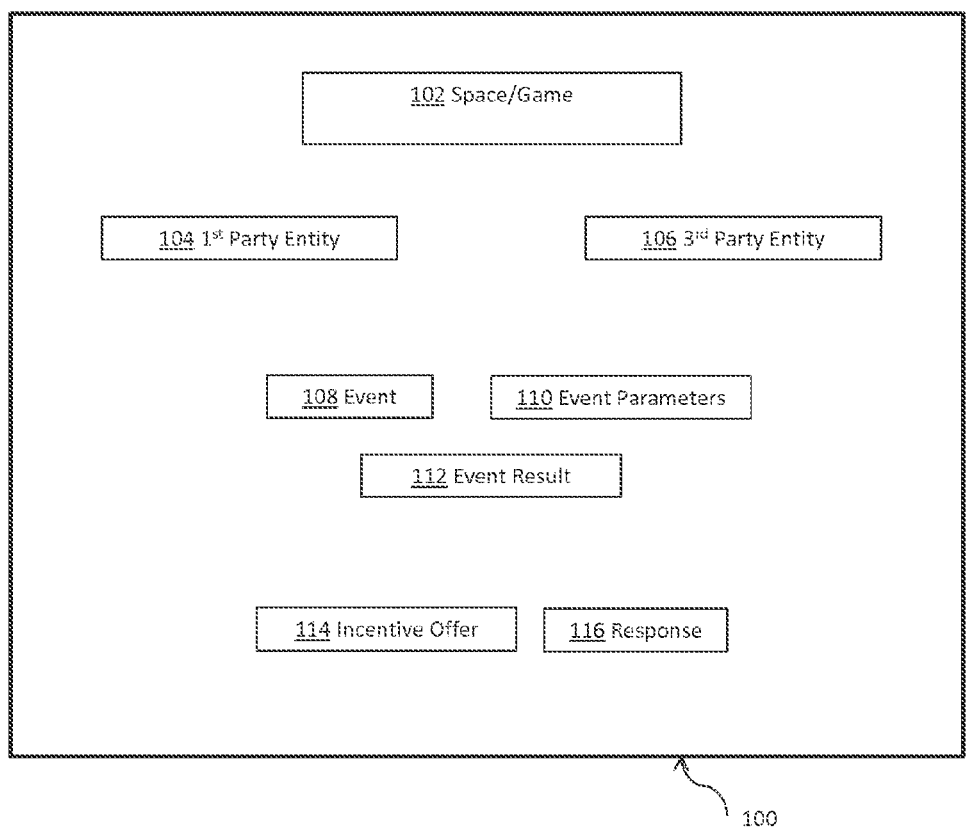
FIG. 4 illustrates a view of a notification of an event that has taken place in a virtual space.

FIG. 4 illustrates a view 100 of a notification generated to inform a user of a trigger event that has occurred in a virtual space. The notification may be transmitted to a user device associated with the user and/or transmitted (and/or forwarded) to one or more presentation control devices from the user device. View 100 of the notification may be presented to the user on the user device and/or the one or more presentation control devices. View 100 may include one or more of a virtual space/game field 102, a first party entity field 104, a third party entity field 106, an event field 108, an event parameter field 110, an event result field 112, an incentive offer field 114, a response field 116, and/or other fields or content. Virtual space/game field 102 may present a name of the virtual space or game in which the trigger event occurred. First party entity field 104 may include information related to one or more entities under control of the user in the virtual space that were impacted by the trigger event. Such information may include a name, a status, a level, inventory information, a health, and/or other information. Third party entity field 106 may include information related to one or more entities not under control of the user (e.g., under another user's control, or non-player characters). Such information may include a name, a status, a level, inventory information, a health, and/or other information. Event field 108 may include an identification of the trigger event. Event parameter field 110 may include event parameters of the trigger event. Event result field 112 may include a result of the trigger event. Incentive offer field 114 may include information related to an incentive offer being extended to the user in the notification. Such information may include one or more of a virtual item offered, a rebate, a price, incentive criteria to be fulfilled by the user, and/or other information. Response field 116 may include information that facilitates a response to the notification by the user. Response field 116 may include information that facilitates tracking of a response of the user to the notification. For example, response field 116 may include a selectable link that results in the user logging in to the virtual space. Response field 116 may include a code or identifier to be presented upon a subsequent login to the virtual space to indicate such login is in response to the notification (e.g., to accept an incentive offer). Other types of information are contemplated for inclusion in response field 116.

Figure 5:
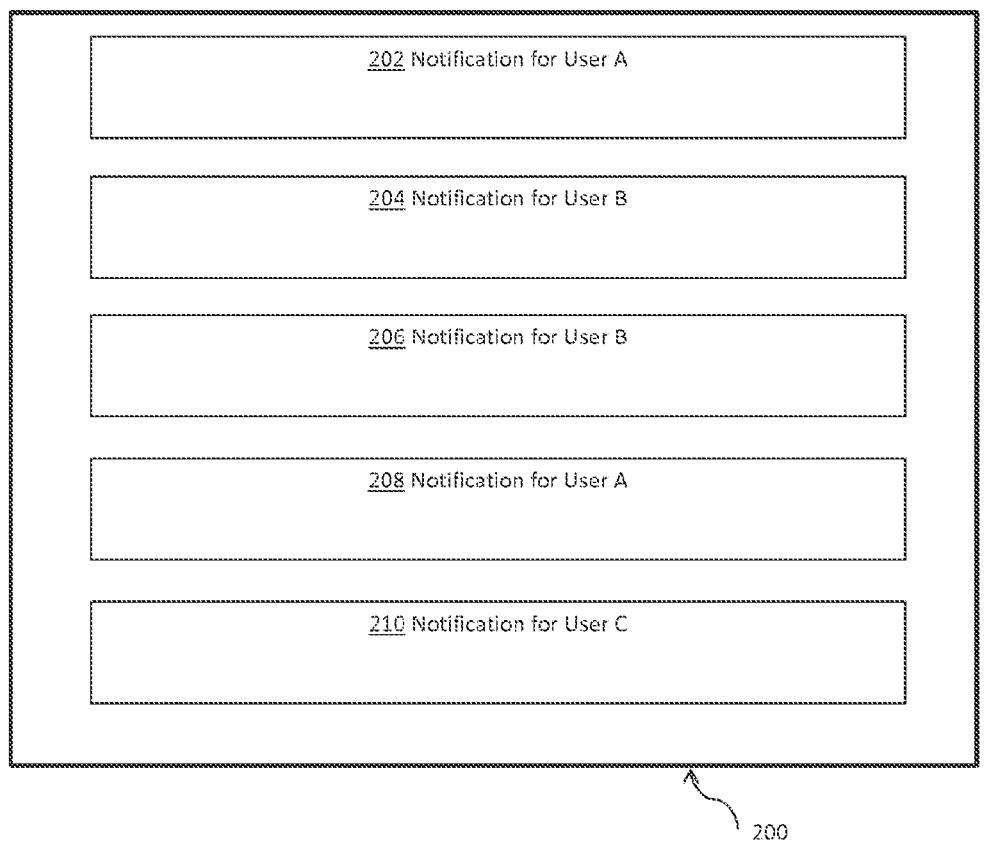
FIG. 5 illustrates an exemplary screenshot of an interface for concurrently displaying multiple notifications that belong to different users.

FIG. 5 illustrates an exemplary screenshot of an interface 200 for concurrently displaying multiple notifications that belong to different users.

Interface 200 may include notifications 202, 204, 206, 208, and 210 where the notifications may belong to different users (e.g., User A, User B, User C, etc.). The order of display in which notifications 202, 204, 206, 208, and 210 may be arranged may be determined based on the timestamp associated with each of the notifications. For example, notification 202 may be the newest notification whereas notification 210 may be the oldest notification. In some embodiments, the order of display may be determined further based on user parameters related to User A, B, and C. For example, the user parameters may comprise an activity metric that indicates an activity of User A, B, or C in the virtual space. In this manner, notifications related to users with a higher activity level (e.g., spending more time in the virtual space, purchasing more items through the virtual space, etc.) may be displayed in a section of the display screen that is more visible and noticeable (e.g., the top of the display screen). Any other user parameters and/or other parameters as discussed herein may be used to influence the order of display.

In some embodiments, a notification may expire after a predetermined time period has elapsed from the date and time of the timestamp associated with the notification. For example, notification 210 may automatically disappear from interface 200 once notification 210 expires.

Figure 6:
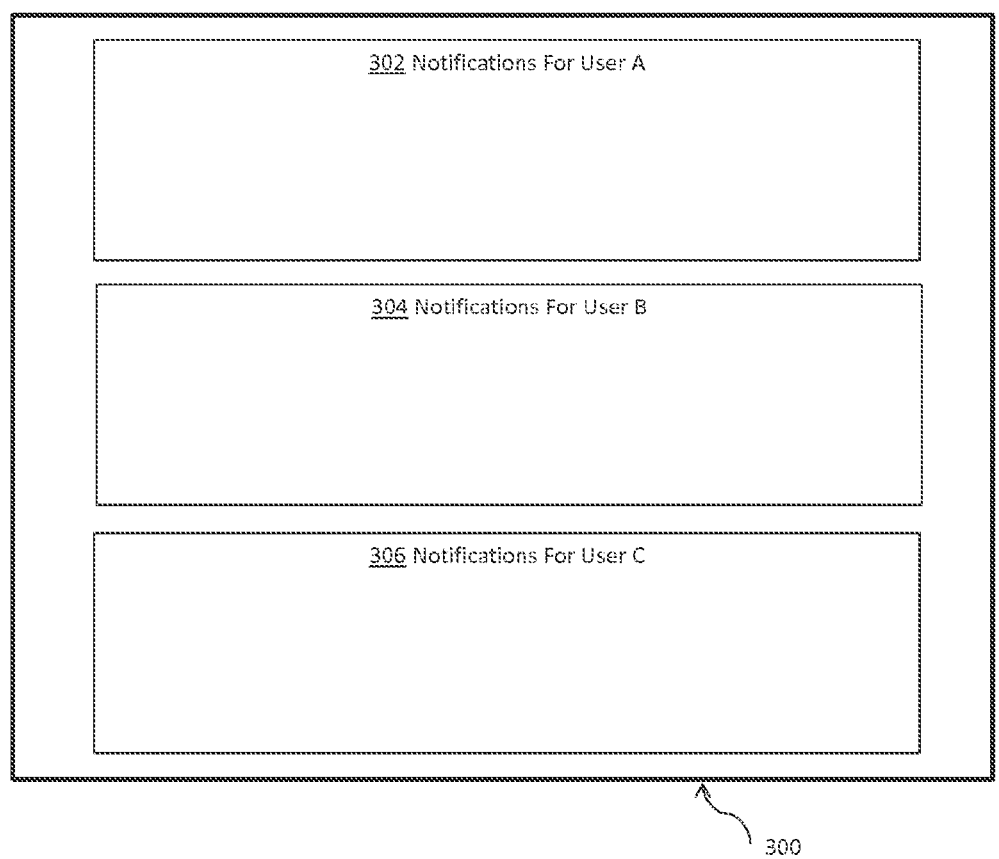
FIG. 6 illustrates another exemplary screenshot of an interface for concurrently displaying multiple notifications that belong to different users.

FIG. 6 illustrates an exemplary screenshot of an interface 300 for concurrently displaying multiple notifications that belong to different users.

Interface 300 may include multiple sections 302, 304, and 306 of display where individual sections 302, 304, and 306 may display one or more notifications intended for different users. For example, all of the notifications that are intended for User A may be grouped into one section 302. All of the notifications that are intended for User B may be grouped into another section 304. All of the notifications that are intended for User C may be grouped into another section 306.

In some embodiments, the order of display in which the sections 302, 304, and 306 may be arranged may be determined based on user parameters (e.g., activity metric) related to User A, B, and C. Any other user parameters and/or other parameters as discussed herein may be used to influence the order of display. In some embodiments, the order of display may be determined based on the timestamp associated with the notifications. For example, a notification section having the newest notification may be displayed at the top of the display screen. Referring to FIG. 6, section 302 for User A may include the newest notification among all of the notifications that are associated with other users (e.g., User B and User C), making section 302 appear at the top of the display screen. On the other hand, section 306 for User C may include the oldest notification, making section 306 appear at the bottom of the display screen.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A presentation control device configured to receive external notifications of events that take place in a virtual space from user devices where the presentation control device is within the vicinity of the user devices, the one or more processors configured to execute one or more computer program instructions which cause the presentation control device to:

receive a first notification intended for a first user from a first user device, the first notification corresponding to a first trigger event that takes place in the virtual space, wherein the first user interacts with one or more entities within the virtual space that is accessible via the first user device;

receive a second notification intended for a second user from a second user device, the second notification corresponding to a second trigger event that takes place in the virtual space, wherein the second user interacts with one or more entities within the virtual space that is accessible via the second user device;

determining an order of display in which the first notification and the second notification should be arranged at least in part based on user parameters related to the first user and the second user, wherein the order of display in which the first notification and the second notification will be presented indicates a spatial arrangement of contemporaneous display of the first notification and the second notification within a view presented via a display unit coupled to the presentation control device, and wherein the user parameters comprise an activity metric that quantifies activity of the first user or the second user in the virtual space such that the order of display indicating the spatial arrangement of contemporaneous display of the first notification and the second notification is determined based on the activity metric; and display, via the display unit coupled to the presentation control device, the first notification and the second notification according to the determined order of display.

2. The presentation control device of claim 1, wherein the occurrence of the first trigger event impacts at least one of the one or more entities that the first user interacts with within the virtual space and wherein, in response to the occurrence of the first trigger event, the first user is identified as a user associated with the first trigger event.

3. The presentation control device of claim 2, wherein a determination of whether the first notification of the first trigger event associated with the first user should be transmitted to the first user is at least in part based on user parameters related to the first user, the user parameters comprising an activity metric that indicates an activity of the first user in the virtual space, a parameter determined from information related to one or more previous notifications transmitted to the first user, and/or a parameter determined from a response of the first user to a previous notification, and wherein, in response to the determination that the notification should be transmitted to the first user, the first user is identified as a user for whom the notification is intended.

4. The presentation control device of claim 1, wherein determining the order of display in which the first notification and the second notification should be arranged is further based, at least in part, on a timestamp associated with each of the first notification and the second notification.

5. The presentation control device of claim 4, wherein the timestamp associated with each of the first notification and the second notification comprises date and time that the each of the first notification and the second notification was generated, transmitted from the corresponding user device, and/or received by the presentation control device.

* * * * *